(12) United States Patent
Meyer et al.

(10) Patent No.: US 10,613,841 B2
(45) Date of Patent: Apr. 7, 2020

(54) TASK UI LAYOUT REPRESENTING SEMANTICAL RELATIONS

(71) Applicant: SAP SE, Walldorf (DE)

(72) Inventors: Joachim Meyer, Heidelberg (DE); Fabian Nicolay, Weinheim (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 15/970,200

(22) Filed: May 3, 2018

(65) Prior Publication Data
US 2019/0339950 A1   Nov. 7, 2019

(51) Int. Cl.
*G06F 8/38* (2018.01)
*G06K 9/62* (2006.01)
*G06N 3/08* (2006.01)

(52) U.S. Cl.
CPC ............. *G06F 8/38* (2013.01); *G06K 9/6215* (2013.01); *G06K 9/6218* (2013.01); *G06N 3/08* (2013.01)

(58) Field of Classification Search
CPC ...... G06F 8/38; G06K 9/6215; G06K 9/6218; G06N 3/08
See application file for complete search history.

(56) References Cited

U.S. PATENT DOCUMENTS

| | | | | |
|---|---|---|---|---|
| 8,073,877 B2 * | 12/2011 | Irmak | ............... | G06F 16/353 707/803 |
| 8,321,435 B2 * | 11/2012 | Zaydman | ............ | G06F 16/284 707/755 |
| 8,949,264 B2 * | 2/2015 | Cohen | ............... | G06F 16/243 707/760 |
| 9,773,053 B2 * | 9/2017 | Lee | ................... | G06F 16/285 |

* cited by examiner

*Primary Examiner* — Roland J Casillas
(74) *Attorney, Agent, or Firm* — Buckley, Maschoff & Talwalkar LLC (57) ABSTRACT

A method and system including at least one data set including one or more properties in a task; a task UI module; a semantic grouping module including a neural network and a property cluster module; a display; and a processor in communication with the task UI module and the semantic grouping module and operative to execute processor-executable process steps to cause the system to: receive the data set at the semantic grouping module; calculate a property vector for each property in the data set, wherein the property vector includes a location of the property vector in a vector space; determine one or more property clusters, via the property cluster module, for all of the property vectors; and automatically generate a section in a user interface for each of the one or more property clusters via the task user interface module. Numerous other aspects are provided.

20 Claims, 10 Drawing Sheets

006
TASK UI LAYOUT REPRESENTING SEMANTICAL RELATIONS

BACKGROUND

Enterprises typically use workflows to accomplish a given activity. The workflow may include a progression of steps (e.g., tasks, events, interactions) that process information to accomplish the activity. The tasks may be an important part of the workflow, and may be performed by human workflow participants. Conventionally, enterprises may use software applications to execute the particular workflow (e.g., workflow instance). The participants may interact with the enterprise workflow application via user interfaces (UI).

The workflow UI is typically created by a developer using a task editor. The developer manually groups the data for display in the UI, which may be a time consuming and inefficient approach to creating a UI layout.

Systems and methods are desired which support the efficient and customizable creation of a task UI.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Enterprises typically use software applications to facilitate execution of a workflow. As used herein, a "workflow" is a progression of one or more steps to complete an activity. There may be several types of steps within a workflow, one of which may be a "task." The task may be, for example, an automated task or a user task (a task to be performed by a user). For example, a workflow participant may need to request approval from a manager for a job, and the workflow may be "request approval." The "request approval" workflow may include two tasks: one task is to enter the data in the form (user task), and a second task is to send the data/form to the manager (automated task). The human workflow participant may interact with a particular workflow instance (running workflow) via task user interfaces (UI) provided to a display of an electronic device. As used herein, the phrases "task user interface" and "user interface" may be used interchangeably.

The task UIs for the workflow may conventionally be created (e.g., modeled or implemented) by hand during design-time of an application (e.g., at a lowest level, a workflow developer may be entering code to indicate how the UI should look, and where the different data should be located on the UI) which is a very time consuming and costly process. The resulting UI may then be rendered during run-time for the workflow participant.

The task UI may communicate with its workflow instance by exchanging data via a workflow context and task context. As used herein, the "workflow context" may refer to data stored at the workflow instance for the one or more tasks that are part of the workflow, and the "task context" may refer to data stored at the task instance. The workflow context may contain data of several tasks (not necessarily from user tasks only). For example, a workflow may also execute custom code implementations which may access, write and change a workflow context. A task context contains properties and their values for completing the task, and may one of: equal the workflow context, be a subset of the workflow context, or may contain additional data beyond the workflow context or subset of the workflow context. The task context data 102 (FIG. 1A), or a subset thereof, is displayed in a UI as pairs of a label 104 (for the property name) and an additional control or field (to display its value) 106 (FIG. 1B). The workflow developer may display the task context data in the UI (FIG. 1B) as it is entered, or may modify the placement of the information.

Figure 1A:
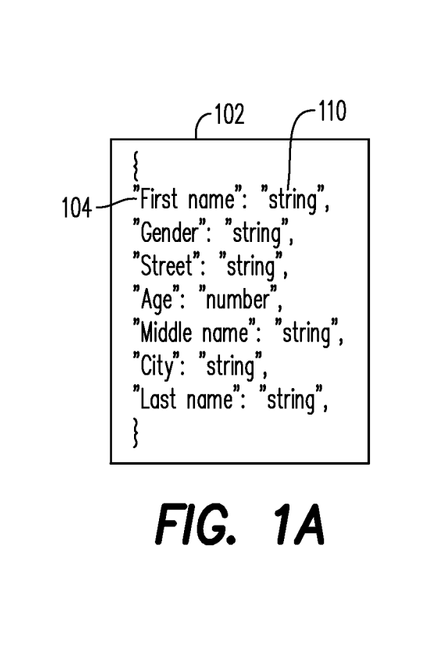
FIG. 1A is a diagram of an input to a system according to some embodiments.
Figure 1B:
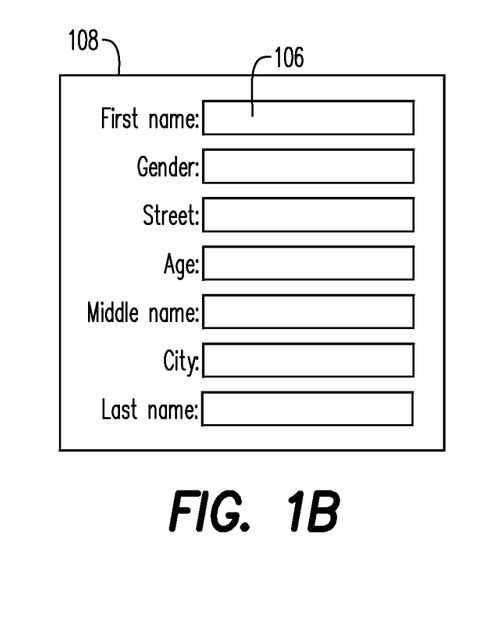
FIG. 1B is an outward view of a conventional graphical interface.

Turning to FIG. 1A, in a non-exhaustive example, a flat structure of the task context data 102 is provided with seven different properties (e.g., labels) 104 and different data types 110. While the properties shown in FIG. 1A include first name, gender, street, age, middle name, city and last name, other suitable properties may be used. Additionally, while seven properties are shown herein, any number of properties may be used. Further, while the different types 110 shown in FIG. 1A include string and number, other suitable data types may be used.

As the task context data 102 may be displayed in a task UI 108 (FIG. 1B) for a workflow participant, the task context data 102 may be mapped directly to the task UI layout 108.

When the properties 104 are mapped directly to the task UI 108, as shown in FIG. 1B, the resulting layout may ignore the semantical relationship of the different properties. A problem with this approach may be that the (hierarchical) structure of the task context data 102 may not necessarily match its semantic structure. For example, semantically, the "first name" may be related to "middle name" and "last name," while "street" and "city" may be semantically related. However, as shown in FIG. 1B, "first name" is next to "gender" which is next to "street," etc.

Figure 1C:
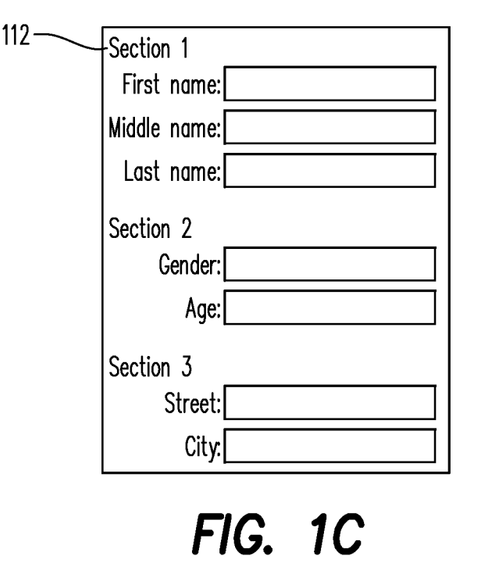
FIG. 1C is an outward view of a graphical interface according to some embodiments.

From a workflow participant perspective, it may be desirable to group semantically similar properties within sections 112 to create a visual hierarchy, as shown in FIG. 1C, to increase the readability and usability of the task UI 108.

Conventional user interface modelers and editors exist for creating UIs. In those editors, it is the task of the Workflow developers to layout the UI and to group properties according to their semantic relations.

In one or more embodiments, a task UI layout may be automatically calculated, based on the task context structure, while preserving semantical relations of the context properties. Embodiments may use a neural network, which has been trained with semantical groups. The training may be via at least one of already existing UIs that group properties to automatically calculate the new task UI layouts, texts in books and other sources that provide semantical relations (e.g., in writings first name and last name may be close together within a sentence), and any other suitable semantical relation source. Over time, the neural network may increase its accuracy as it receives more semantical groups (e.g., task UIs) and deal with an every-increasing layout complexity. While embodiments may be described herein with respect to training the neural network with existing UI groups, any suitable training material may be used to train the network. In one or more embodiments, the calculated task UI layout may: 1. be provided to the workflow developer as an initial framework for his work that he may modify; or 2. may be rendered automatically for a workflow participant at runtime.

The inventors note that the workflow developer may benefit in time savings from the calculated initial layout of the task UI. The initial provided layout may be used to rapidly implement or model the task UI, making the development of the task UI more efficient. Embodiments may save a lot of time and money which may otherwise have been spent creating task UIs manually. The inventors also note a benefit of the automatic generation of the task UI for the workflow participant at runtime may be that the task UI may be built without using someone with knowledge of how to layout the UI, making the process more efficient. Additionally, the automatic generation of the task UI at runtime may make a task prototyping process more efficient, as a developer may see how a task could execute without spending time to generate the task UI manually.

Figure 2:
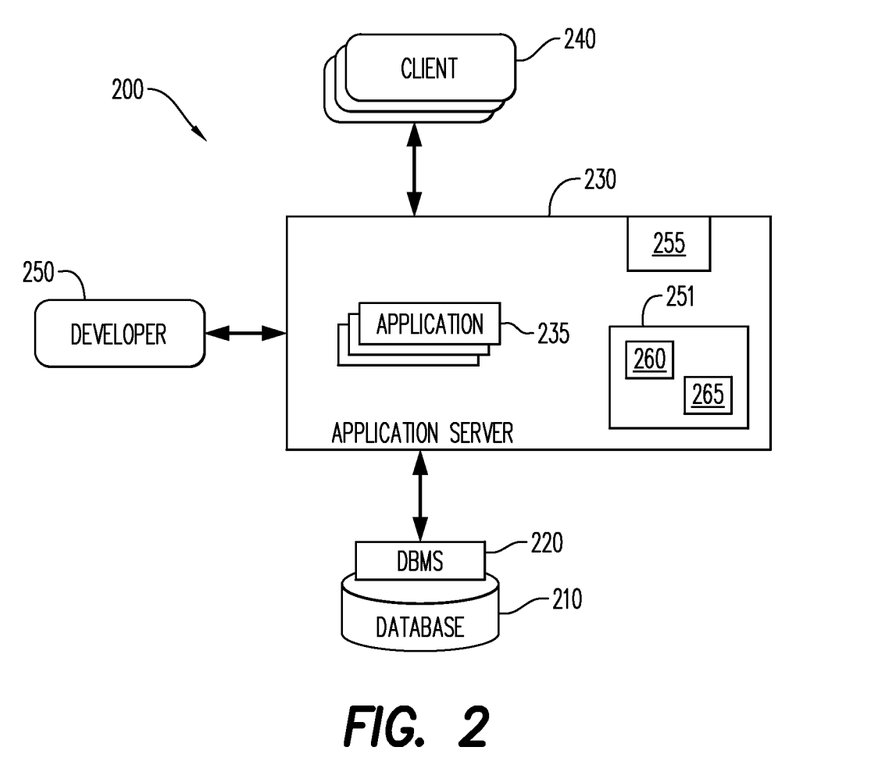
FIG. 2 is a block diagram of a system architecture according to some embodiments.

FIG. 2 is a block diagram of system architecture 200 according to some embodiments. Embodiments are not limited to architecture 200 or to a three-tier database architecture.

Figure 10:
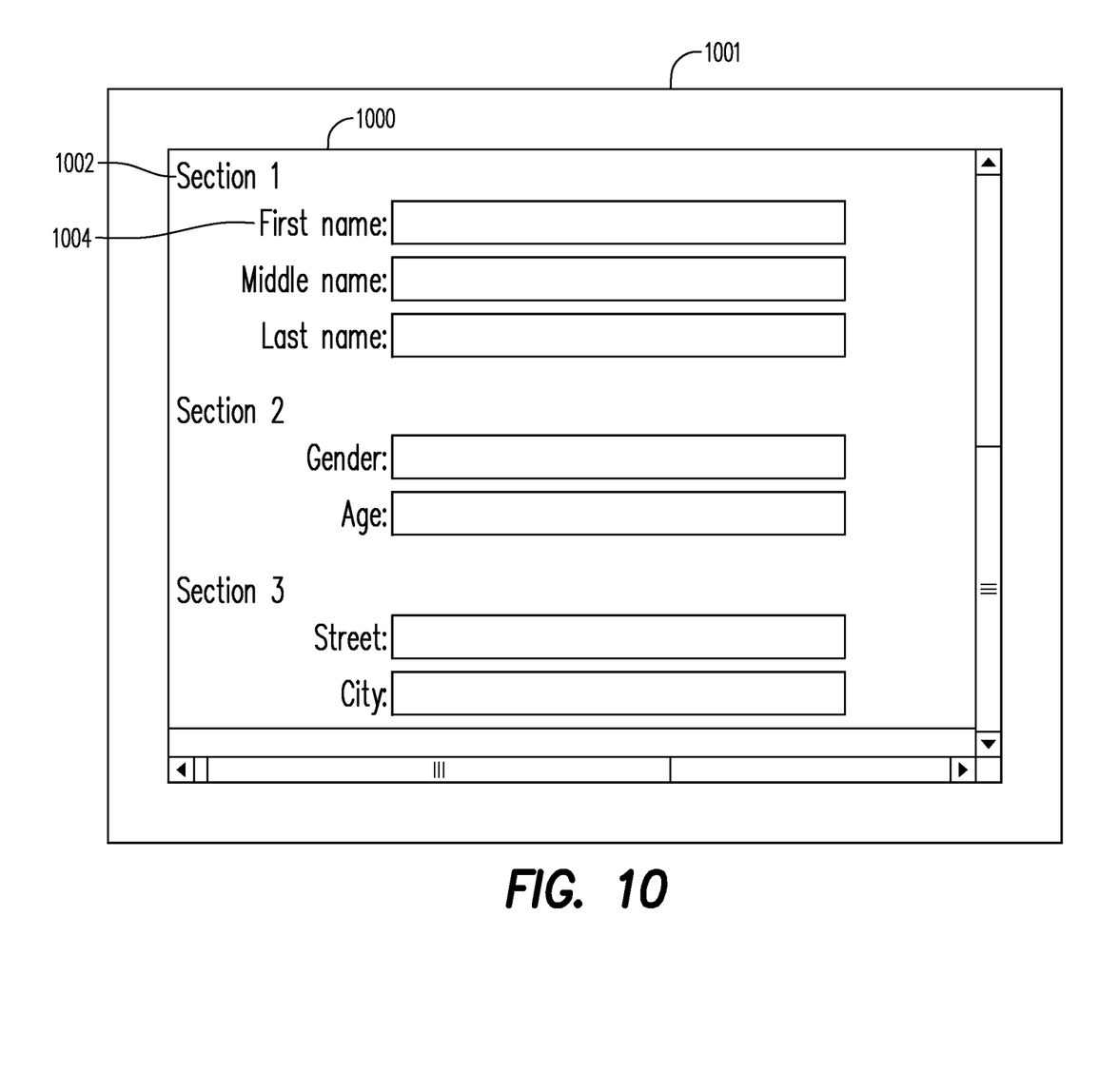
FIG. 10 is an outward view of a graphical interface according to some embodiments.

Architecture 200 includes database 210, database management system (DBMS) 220, application server 230, applications 235, clients 240, a developer 250, a task UI module 255, a semantic grouping module 251, a neural network 260, and a property cluster module 265. Applications 235 may comprise server-side executable program code (e.g., compiled code, scripts, etc.) executing within application server 230 to receive queries from clients 240 and provide results to clients 240 based on data of database 110. A developer 250 or a client 240 (e.g., workflow participant) may access the semantic grouping module 251, including the neural network 260 and property cluster module 265, and the task UI module 255 executing within application server 230, to generate a task UI layout 1000 (FIG. 10). In one or more embodiments, the semantic grouping module 251 may include the property cluster module 265 and the neural network 260. The task UI module 255 may receive one or more semantic groups 312 from the semantic grouping module 251, and may provide the task UI layout to a UI renderer of the task UI module 255 to facilitate the creation of a task UI for use with a workflow.

Application server 230 provides any suitable interfaces through which the clients 240 (e.g., workflow participant) and developer 250 may communicate with the semantic grouping module 251, task UI module 255, property cluster module 265, or applications 235 executing on application server 230. For example, application server 230 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 235 executing on server 230 may communicate with DBMS 220 using database management interfaces such as, but not limited to, Open Database Connectivity (ODBC) and Java Database Connectivity (JDBC) interfaces. These types of applications 235 may use Structured Query Language (SQL) to manage and query data stored in database 210.

DBMS 220 serves requests to retrieve and/or modify data of database 210, and also performs administrative and management functions. Such functions may include snapshot and backup management, indexing, optimization, garbage collection, and/or any other database functions that are or become known. DBMS 220 may also provide application logic, such as database procedures and/or calculations, according to some embodiments. This application logic may comprise scripts, functional libraries and/or compiled program code.

Application server 230 may be separated from, or closely integrated with, DBMS 220. A closely-integrated application server 230 may enable execution of server applications 235 completely on the database platform, without the need for an additional application server. For example, according to some embodiments, application server 230 provides a comprehensive set of embedded services which provide end-to-end support for Web-based applications. The services may include a lightweight web server, configurable support for OData, server-side JavaScript execution and access to SQL and SQLScript.

Application server 230 may provide application services (e.g., via functional libraries) which applications 235 may use to manage and query the data of database 210. The application services can be used to expose the database data model, with its tables, hierarchies, views and database procedures, to clients. In addition to exposing the data model, application server 230 may host system services such as a search service.

Database 210 may store data used by at least one of: applications 235, the semantic grouping module 251, the task UI module 255, the property cluster module 265 and the neural network 260. For example, database 210 may store existing task UI layouts that may be used by the semantic grouping module 251 as training data for the neural network 260, which in turn may be accessed by the property cluster module 265. Then the semantic grouping module 251 may generate the semantic grouping based on the property cluster. The task UI module 255 may receive output from the semantic grouping module 251 to generate the task UI 1000.

Database 210 may comprise any query-responsive data source or sources that are or become known, including but not limited to a structured-query language (SQL) relational database management system. Database 210 may comprise a relational database, a multi-dimensional database, an eXtendable Markup Language (XML) document, or any other data storage system storing structured and/or unstructured data. The data of database 210 may be distributed among several relational databases, dimensional databases, and/or other data sources. Embodiments are not limited to any number or types of data sources.

In some embodiments, the data of database 210 may comprise one or more of conventional tabular data, row-based data, column-based data, and object-based data. Moreover, the data may be indexed and/or selectively replicated in an index to allow fast searching and retrieval thereof. Database 210 may support multi-tenancy to separately support multiple unrelated clients by providing multiple logical database systems which are programmatically isolated from one another.

Database 210 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Developer 250 and client 240 may comprise one or more individuals or devices executing program code of a software application for presenting and/or generating user interfaces to allow interaction with application server 230. Presentation of a user interface as described herein may comprise any degree or type of rendering, depending on the type of user interface code generated by application server 230. As used herein, the terms "client" and "workflow participant" may be used interchangeably.

For example, a client 240 may execute a Web Browser to request and receive a Web page (e.g., in HTML format) from a website application 235 of application server 230 via HTTP, HTTPS, and/or WebSocket, and may render and present the Web page according to known protocols. The client 240 may also or alternatively present user interfaces by executing a standalone executable file (e.g., an .exe file) or code (e.g., a JAVA applet) within a virtual machine.

FIGS. 3-10 include a flow diagram of processes 400 (FIG. 4) and 600 (FIG. 6) described with respect to a block diagram and an outward view of user interface according to some embodiments. Processes 400/600 may be executed by application server 230 according to some embodiments, e.g., by execution of the UI module 255 to provide a developer or workflow participant with an automatically generated task UI layout, and subsequently the user interface 1000. In one or more embodiments, the application server 230 may be conditioned to perform the processes 400/600, such that a processor 1110 (FIG. 11) of the server 230 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 1000 may be presented on any type of display apparatus (e.g., desktop monitor, smartphone display, tablet display) provided by any type of device (e.g., desktop system, smartphone, tablet computer). The UI renderer 314 which is executed to provide user interface 1000 may comprise a Web Browser, a standalone application, or any other application. Embodiments are not limited to user interface 1000 of FIG. 10.

Figure 5:
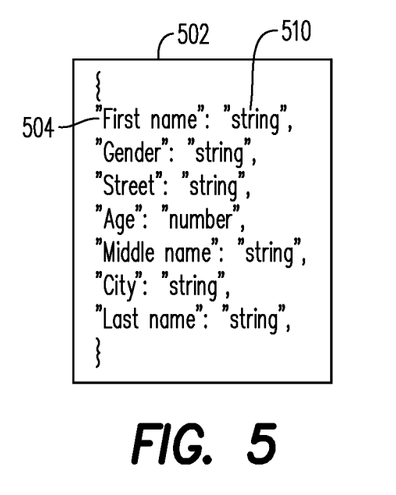
FIG. 5 is a diagram of a data structure according to some embodiments.

Initially, at S410, a data set 302 is received at a semantic grouping module 251. The data set 302 may be a task context structure 102, and may include one or more properties 504 to include in the task UI 1000 (FIG. 10). As a non-exhaustive example, the data set 302 may include a task context structure 502 as shown in FIG. 5. Each property 504 may be associated with a data type 510, as described above with respect to FIG. 1A. In one or more embodiments, the semantic grouping module 251 may normalize and/or manipulate each of the properties 504 in the data set 302 to create a property set 304. The property set 304 may contain all properties of a task context structure, where the properties may be normalized. For example, the semantic grouping module 251 may receive a property 504 in the form of a technical name or other format, and may normalize the property name to a common format. Normalization may include, for example, converting the text to lower case, translating the lower-case text into a common language, and replacing spaces and special characters by an underline character.

For example, assume a task context structure is as follows:

```
{
"nachname" : "string",
"city" : "string",
"first name" : "string",
"zip" : "string"
}
```

The normalized property set is: ["first_name", "city", "last_name", "zip"]. This set may be provided as input to the neural network, as described further below, and a vector may be calculated for each property.

Figure 3:
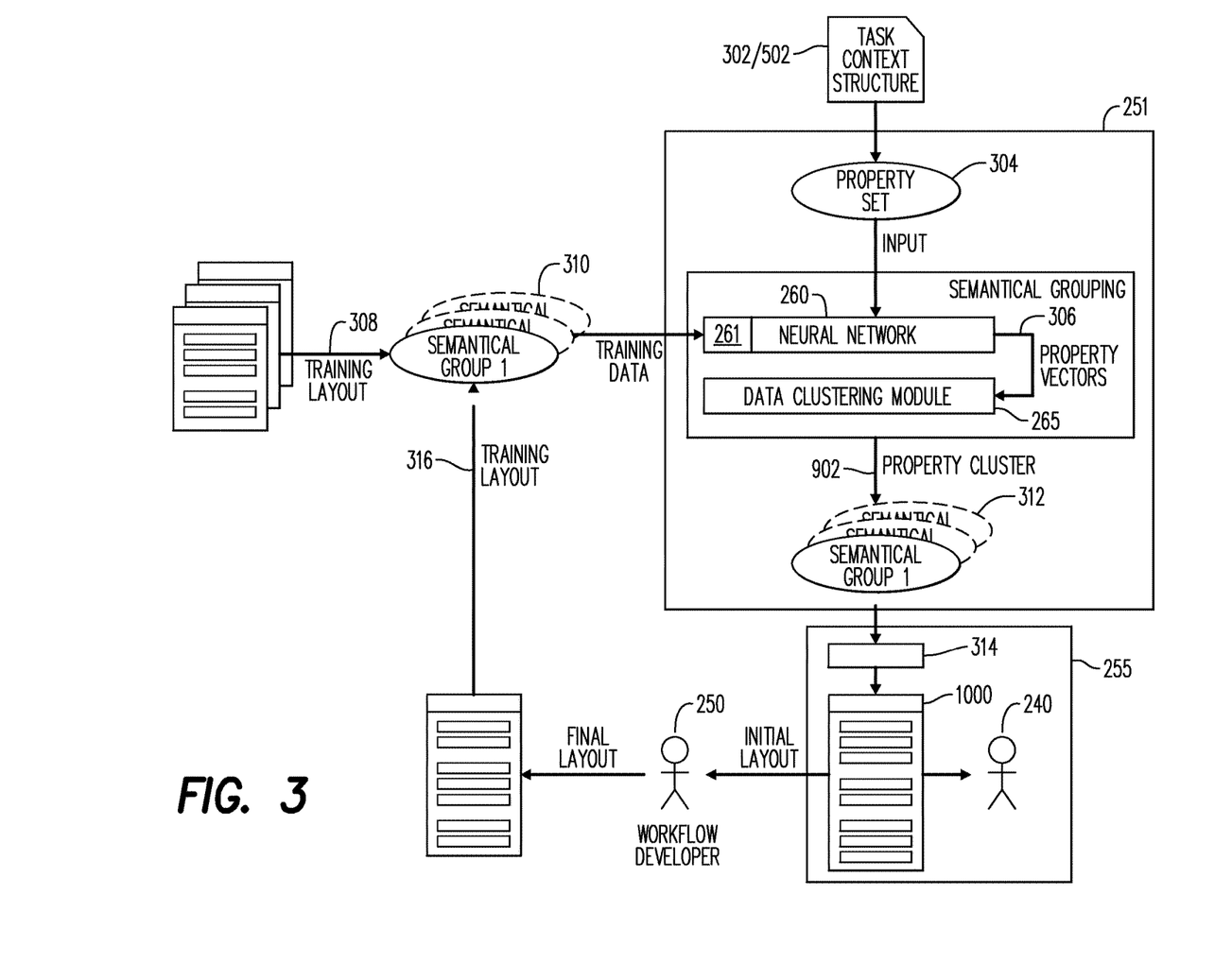
FIG. 3 is a block diagram of a system architecture according to some embodiments.

As a non-exhaustive example of a normalization, the semantic grouping module 251 may receive at least one of "Last name" and "last Name," which may both be normalized to "last_name". As a non-exhaustive example of a manipulation and/or normalization, the received property "Nachname," which is the German word for "last name", may first be translated to "last name" and then be normalized to "last_name." As still another example, the semantic grouping module 251 may detect typographical errors (e.g., firstnmae) and normalize it to the correct spelling (first name). Other suitable normalizations and/or manipulations may be executed. The normalized and/or manipulated property may be added to the property set 304. In one or more embodiments the property 504 may not be normalized and/or manipulated before it is appended to the property set 304. Continuing with the non-exhaustive example above, the normalized property set 304 may be: [first_name, gender, street, age, middle_name, city, last_name].

Then, in S412, the semantic grouping module 251 may generate the normalized property set 304 (extracted/normalized from the task context). Next, in S413, in one or more embodiments, the neural network 260 may receive each property 504 in the normalized property set 304 and calculate a corresponding property vector 306 for each property name in the property set 304. In one or more embodiments, the calculated property vector includes a location of the vector in vector space. In one or more embodiments, the neural network 260 may transform the property 504 into a mathematical representation, such as a property vector. It is noted that other approaches may be used to semantically group properties. While embodiments herein describe mapping a property name to a property vector, other suitable approaches may be used to give a property name a mathematical representation, which may be clustered, using a neural network.

In one or more embodiments, the neural network 260 is able to learn from existing task UI layouts created in the past ("training layouts" 308) by developers 250, for example, or from newly created task UI layout implemented by a Workflow developer (online learning). In one or more embodiments, after the neural network 260 has learned from training layouts 308, the neural network 260 may be considered "trained". Over time, the neural network 260 learns continuously which properties are semantically similar due to an increasing amount of training data (e.g., every time a new task UI layout is input to the neural network 260, the neural network 260 learns new semantical groups and updates its weights, which leads then to updated property vectors accordingly). In one or more embodiments, the neural network 260 may calculate semantical similarities between properties which it may not have been explicitly trained with. For example, if property X is often placed nearby property Y in a task UI layout, and property Z is often placed nearby property Y, the neural network 260 may detect a semantical similarity between property X and Z.

Figure 6:
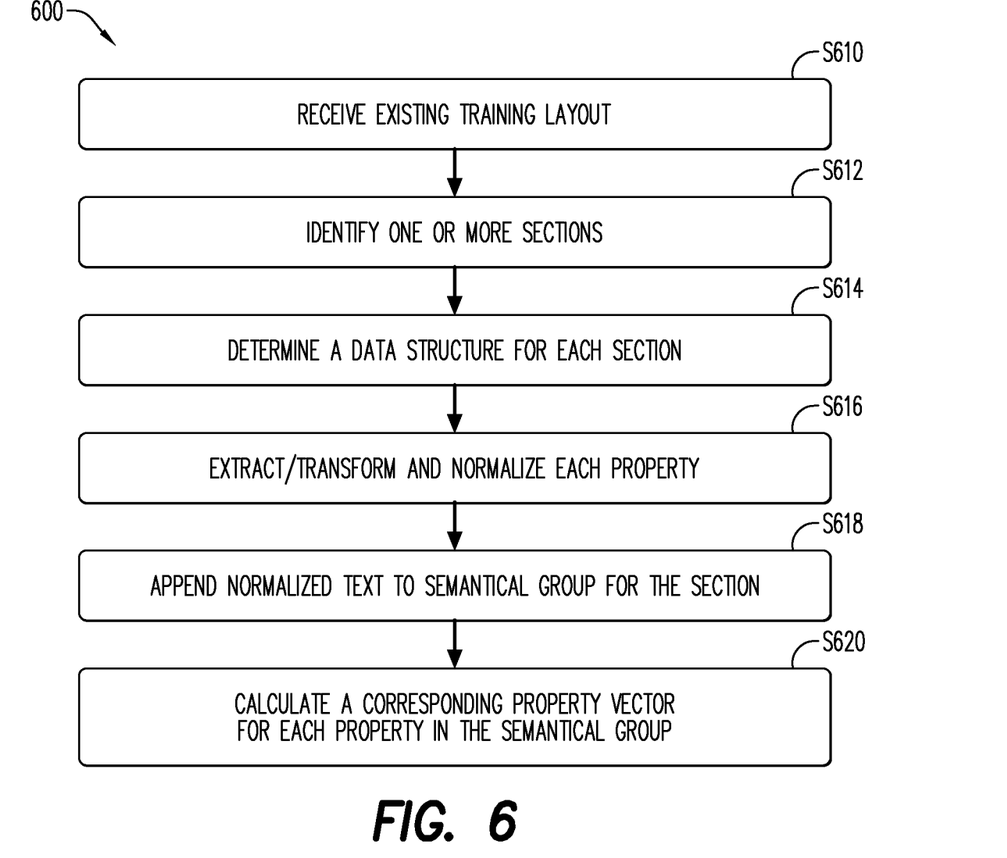
FIG. 6 is a flow diagram of a process according to some embodiments.

Turning to FIG. 6, a process 600 is provided for training the neural network 260, for a similar workflow. In S610, a set of one or more existing training layouts 308 is received by a pre-processor element 261. It is noted that the pre-processor element 261 may depend on the network itself. Then in S612, the pre-processor element 261 identifies at least one section 702 (FIG. 7A) in the UI, where the section 702 includes one or more properties 104/504. As used herein, a "section" 702 may refer to an area of a UI layout 700/1000 where one or more properties 104/504 are grouped together. For each section 702, the pre-processor element 261 may determine a data structure (also referred to as a "semantical group") for the section in S614. The data structure may be a semantical group 310 whereby the properties in the data structure are semantically related. In one or more embodiments, a property X is defined to be semantically similar to another property Y if these properties are placed nearby within the same section in a task UI layout in the past. The pre-processor element 261 may then in S616 extract/transform and normalize each property 104/504 in the section 702. For example, the pre-processor element 261 may read the technical name associated with the property and then extract the text of the corresponding label for the property in the existing UI layout (e.g., extract "first name" for property "f name") and translate the text of each of the properties into a common language and normalize the text. As such, in embodiments, the task context property name may differ from the label in the UI. In one or more embodiments, the neural network receives at least one of the technical name and the UI label as part of the semantical group, as described below. A benefit of translating between the names/labels is noted as follows: if a neural network is always trained with technical names, then it learns that e.g., "f name" is close to "l.name", and when the workflow developer mostly uses these terms in his task context, the neural network will provide matches; however, when the workflow developer uses "first name" or "last name," the trained data will not match. After the properties 104/504 are in a common language, the pre-processor element 261 may normalize the text (e.g., convert text to lower/upper case; replace spaces and special characters by an underline). Next, in S618, the normalized text of each property may be appended to the semantical group 310 for the section 702 to be received by the neural network 260 to train the neural network 260.

Figure 7A:
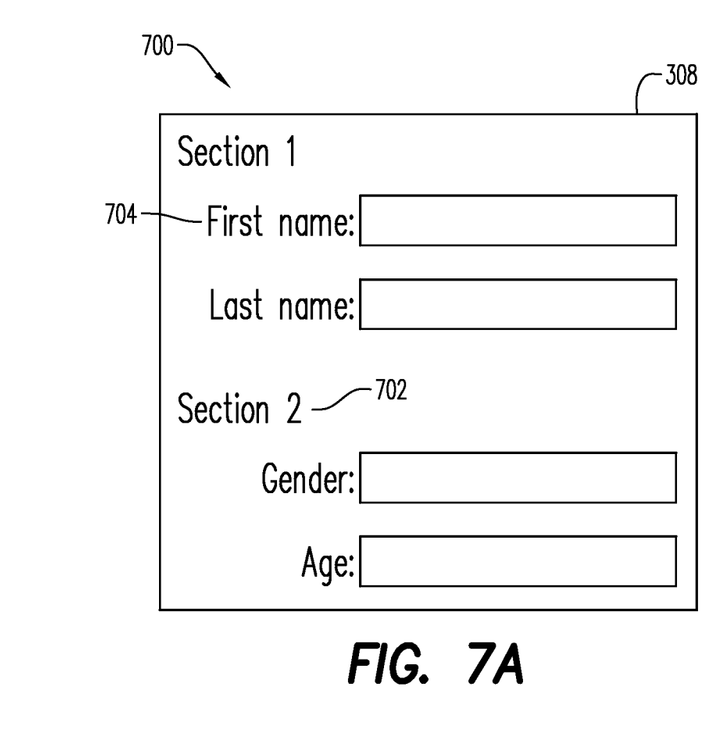
FIG. 7A is an outward view of a graphical interface according to some embodiments.

As a non-exhaustive example, FIG. 7A provides an existing task UI layout 700. The existing layout 700 includes two sections 702 (Section 1 and Section 2), with two properties 704, each (e.g., Section 1: First name, Last name; and Section 2: Gender, Age). The property names may be normalized, as described above, and then may be added to the semantical group 310 for each section. The normalized property name in the semantical group may be: Semantical group for section 1: [first_name, last_name]; Semantical group for section 2: [gender, age].

Figure 7B:
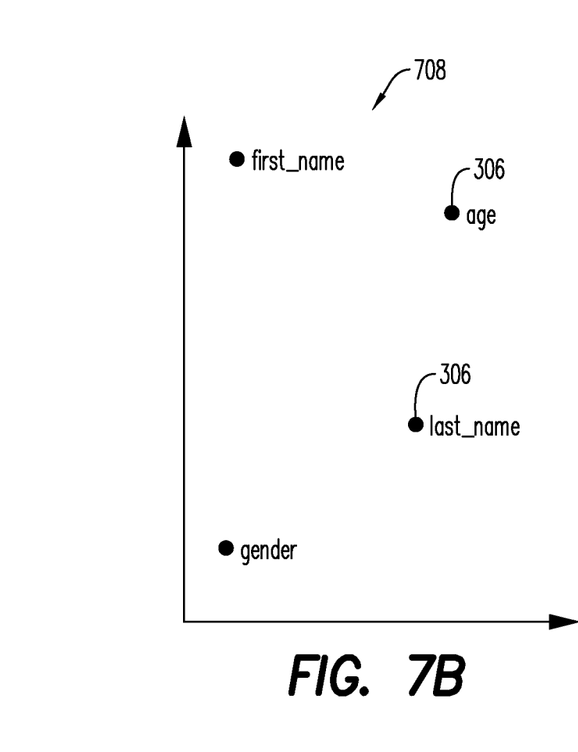
FIG. 7B is a graph according to some embodiments.

Then in S620, neural network 260 may calculate a corresponding property vector 306 for each of the normalized property names in each semantical group, where each of the property vectors 306 includes a description of the location of the vector in a vector space 708 (FIG. 7B). It is noted that the neural network 260 knows that the training properties are semantically related. In one or more embodiments, this may be achieved by training the neural network with all properties within the same semantical group simultaneously or substantially simultaneously (not necessarily in parallel).

In the non-exhaustive example shown herein, the output of the neural network 260 is a two-dimensional vector space 708. Training the neural network 260 may describe the neural network 260 receiving input in the form of semantical groups 310, and the neural network may then adjust its weights, and thereafter positions of the property vectors, accordingly. In the vector space 708 shown in FIG. 7B, the property vectors 306 of semantical similar properties are not yet located in close proximity to each other, as the accuracy of the neural network increases with an increasing amount of training data.

Continuing with the non-exhaustive example above, another existing task UI layout 800 (FIG. 8A) may be used to train the neural network 260. In the second existing task UI layout 800, the corresponding properties "gender" and "age" 804 are in the same section 802 as they are in the first existing task UI layout 700. The properties "first name" and "last name" 804 are also in the same section 802 as they are in the first existing task UI layout 700. The section 802 including "first name" and "last name" also includes a new property—"middle name" 804. Additionally, a third section 802 is included in the second existing task UI layout 800 with properties "street" and "city" 804 thus far unknown to the neural network 260. These property names [gender, age, first name, middle name, last name, street and city] may be extracted, normalized, and added to the semantical group for each section, as described above. For example, the normalized property name in the semantical group may be: Semantical group for section 1: [gender, age]; for section 2: [first_name, middle_name, last_name]; and for section 3: [street, city].

Figure 8A:
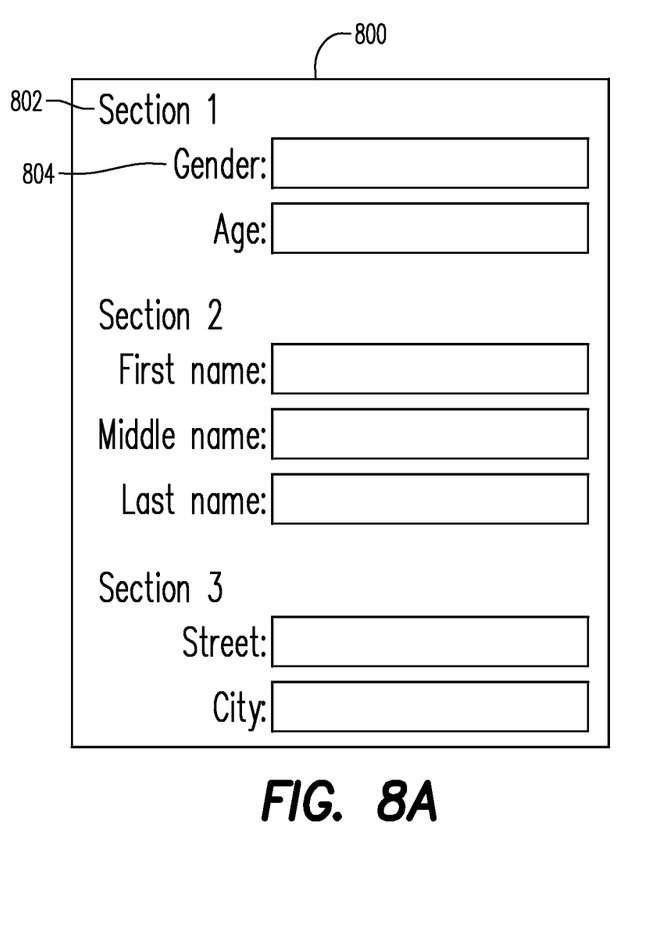
FIG. 8A is an outward view of a graphical interface according to some embodiments.
Figure 8B:
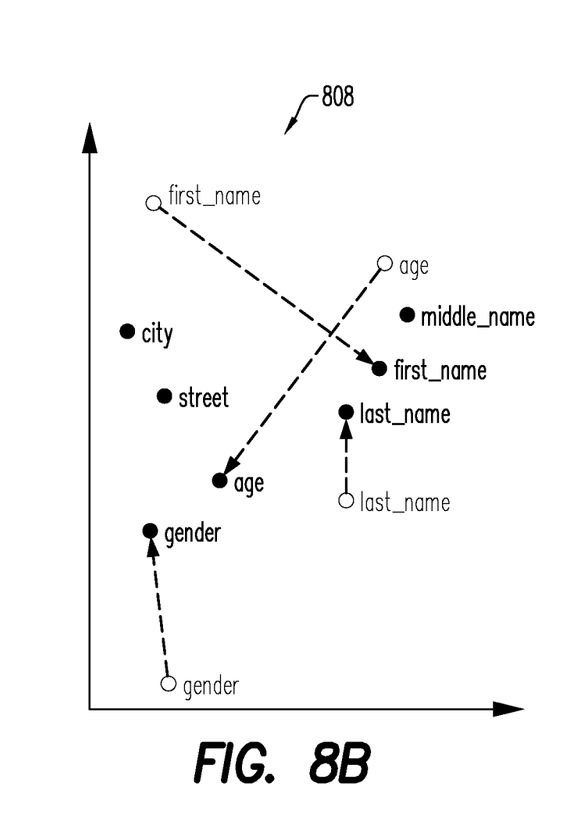
FIG. 8B is a graph according to some embodiments.

The neural network 260 may receive this semantical group data to be trained. As described above, the neural network 260 may then calculate a property vector 306 for each of the normalized property names, where each of property vectors 306 may include a location of the property vectors position, which may be visualized in a vector space 808 (FIG. 8B). In one or more embodiments, nodes within the neural network may be connected by weighted arcs. Based on the training data, those weights may be adjusted accordingly, such that for semantical similar properties, property vectors may be calculated with close proximity. The number of occurrences of training data with similar semantical groups may have an impact on the weights. The vector space 808 in FIG. 8B shows that since the properties "First name" and "Last name" are already known to the neural network 260 per the first training set in FIGS. 7A/7B, and are in a same semantical group again, the properties have a high semantic similarity and are moved closer together in the vector space 808 (as indicated by the dotted lines), as compared to their position in the vector space 708 in FIG. 7B. In one or more embodiments, the neural network 260 may determine the properties "First name" and "Last name" in the second training set correspond to properties in the first training set and are positioned in a same semantical group in the first training set as in the second training set. Based on this determination, the neural network 260 may determine the properties in the second training set have a high semantic similarity, and may determine a location of the properties closer together in the vector space.

Likewise, as the properties "gender" and "age" are previously or already known to the neural network 260, and are in a same semantical group again, the properties are moved closer together in the vector space 808, as compared to their position in the vector space 708 in FIG. 7B. The additional property (Middle name) has been placed in close proximity to "First name" and "Last name," as it is placed in the same section in the existing task UI layout 800. As shown herein, the newly introduced properties of the third semantical group (i.e. Street and City) are positioned in close proximity to each other. However, as they are newly introduced, they may have a low semantic similarity to the known properties. It is noted that since they are new, the properties in the third semantical group may also have a low semantic similarity to each other, and may not be positioned close to each other in the vector space the first time they are introduced. As shown in FIG. 10, the newly introduced "Street" and "City" are in Section 3 of the UI. It is noted that over time, the neural network 260 may increase in accuracy in locating the property vector positions in the vector space, according to their semantical similarity.

Figure 9A:
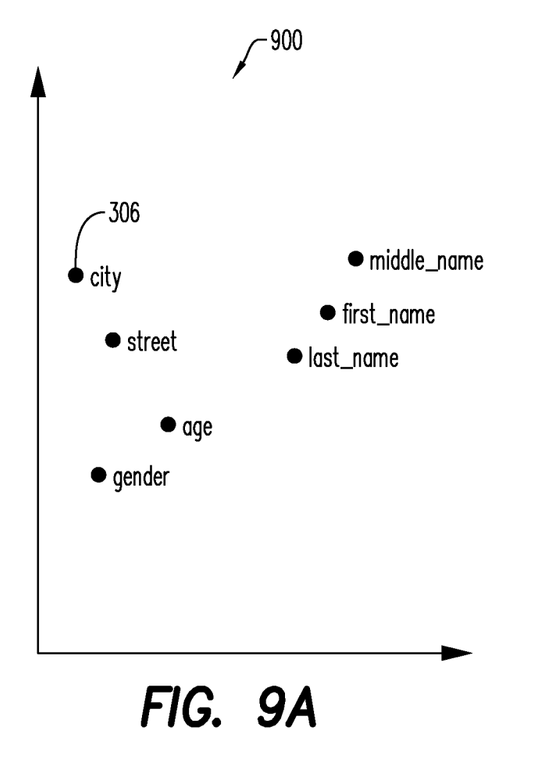
FIG. 9A is a graph according to some embodiments.
Figure 9B:
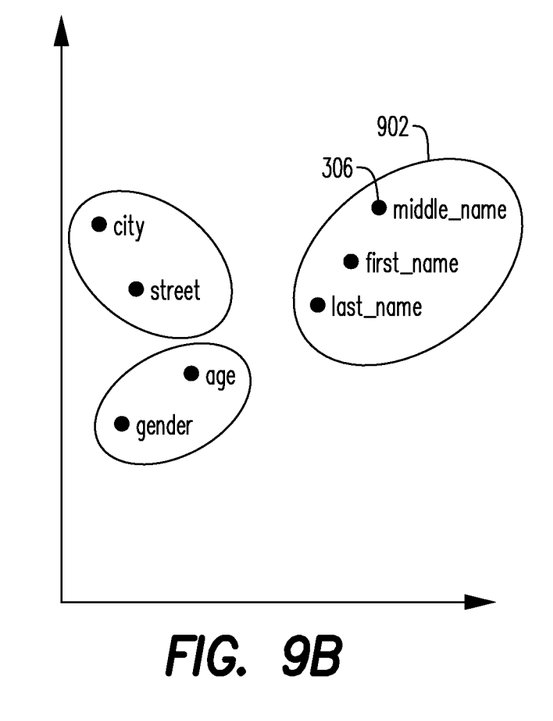
FIG. 9B is a graph according to some embodiments.

Turning back to the process 400, and continuing with the non-exhaustive example, the calculation of the property vector in S413 by the neural network 260, includes the location of the vector 306 in a visualized vector space 900 (FIG. 9A). The neural network 260 may calculate the vector (and its inherent location) based on the previously trained neural network (e.g., the training sets described above with respect in FIGS. 7A/7B/8A/8B) in a manner described above with respect to determining the vectors in the second training set (FIGS. 8A/8B) based on the first training set (FIGS. 7A/7B). It is noted that only when the neural network is trained with the property may it determine a property vector, as after the neural network has been trained, it is able to return the trained vector, in response to a query, for a given property without further computation. In one or more embodiments, the property names not yet known to the neural network 260 may be assigned to their own semantic group (even if there may be no semantical relation), for which a separate section in the task UI layout is created, for layout reasons in the UI. Continuing with the example, above, for the normalized property set ["first_name", "city', "last_name", "zip"], an output of the neural network may be [[1,4,3], [5,7,8], [5,7,9]] where [1,4,3] may be the vector for "first_name", etc.

Next, in S414, the property cluster module 265 determines one or more property clusters 902 (FIG. 9B) for all of the property vectors 306. In one or more embodiments, the property cluster module 265 may identify groups or clusters in the property vectors, and the clusters are the semantic groups that may be used by the task UI module 255 to generate the layout of the task UI. In one or more embodiments, each cluster 902 may contain a subset of the property vectors whose corresponding properties may then be assigned to a same semantical group 312. In one or more embodiments, the property cluster module 265 may use any suitable clustering process. For example, in one or more embodiments the property cluster module 265 may determine a cosine similarity between vectors 306 in the vector space 900, and when the determined cosine similarity between two vectors is below a threshold, the two vectors are in a same cluster. Continuing with the example above, the property cluster module 265 may detect that [1,4,3] and [1,5,3] as well as [5,7,8] and [5,7,9] are close to each other and form property clusters. The results may then be [[1,4,3], [1,5,3]] and [[5,7,8], [5,7,9]]. Other suitable clustering processes include K-Means clustering, Mean-Shift clustering, Density-Based Spatial Clustering of Applications with Noise (DBSCAN), Expectation-Maximization (EM) Clustering using Gaussian Mixture Models (GMM), Agglomerative Hierarchical Clustering, etc.

The semantical grouping module 251 may then create the semantical group (i.e. data structure) 312 for each property cluster 902 in S416. Continuing with the above example, because the original property names for the vectors are known, the semantical groups may be created (e.g., ["first_name", "last_name"] and ["city", "zip"]. With these semantical groups, a UI may be rendered. In one or more embodiments, the semantical group may be used to automatically determine the layout of the task UI 1000. In one or more embodiments, the semantic grouping module 251 may, for each property vector 306 in the property cluster 902, determine a corresponding original property name from the task context structure 102/502 input to the semantic grouping module 251. Then, when rendering the UI via the task UI module 255, as described below, the original property name may be assigned to the label on the UI for semantical group 312 for the property cluster 902.

After creating a semantical group 312, the task UI module 255 may receive the semantical group 312 and generate the task UI 1000 (FIG. 10) in S418. In one or more embodiments, the semantical group 312 may be received at a UI renderer 314 of the task UI module 255. The UI renderer 314 may use any suitable process able to generate a UI. The UI may be displayed on any suitable display 1001. The UI renderer 314 may create a section 1002 in the task UI 1000 for each semantical group 312, such that the property vectors in a same cluster may be positioned in the UI in a same section. Additionally, in one or more embodiments, the UI renderer 314 may create a label in the section 1002 with the property name 104/504 as the text. In one or more embodiments, taking the display hierarchy into account (e.g., if the display hierarchy is part of the data as input for the neural network, then it may also be part of the output), the UI renderer 314 may receive semantical groups from the semantical group module output, also containing the display hierarchy.

For example, assuming the display hierarchy is part of the training data, NN Input (two semantical groups): [["zip", "city", 2], ["first_name", "last_name", 0]]. In this example, the input data for the neural network may be enhanced, where a number, part of a semantical group, indicates the section's position (e.g., where 0 means it is the first section and 2 it is the third section). When the semantic grouping module is now queried e.g., with ["first_name"", "city", "last_name", "zip"], the result is again the trained semantical groups, but with the display hierarchy information: ["first_name", "last_name",0] and ["zip", "city", 2].

In embodiments, the workflow developer 250 may use the task UI 1000 as a template to modify or to save for use by the workflow participant 240 at run-time. In one or more embodiments, the structure of the task context may be explicitly defined or implicitly inferred from example task context data. During design time, a workflow developer 250 may provide example task context (with data) or an explicit structure (with types) for an initial layout. An exemplary structure: {→ name: "string"} with a corresponding exemplary data of: {→ name: "Bob"}. It is noted that for an automatically calculated UI, the task context with data is often available. In order to know which control may need to be rendered, the type (e.g., String) may be derived, if structure is unavailable.

In other embodiments, the generated task UI may be automatically displayed for the workflow participant 240 at run-time without review by the workflow developer 250. As described above, in embodiments, the task UI 1000 may be generated during run-time of the workflow based on run-time data, with no previous involvement of the workflow developer 250, in response to a workflow participant query.

In one or more embodiments, the generated task UI 1000 may be saved, or modified and saved, to be displayed to the workflow participant 240 in response to a received query. In one or more embodiments, online training may be performed if either new and not yet known layouts may be fed to the neural network 260, or an initially generated layout is modified afterwards by the workflow developer 250 during design-time. When the neural network 260 learns during run-time from automatically generated layouts, the workflow participant 240 may be able to provide feedback to the layout (e.g., like/dislike, or layout proposals).

Figure 11:
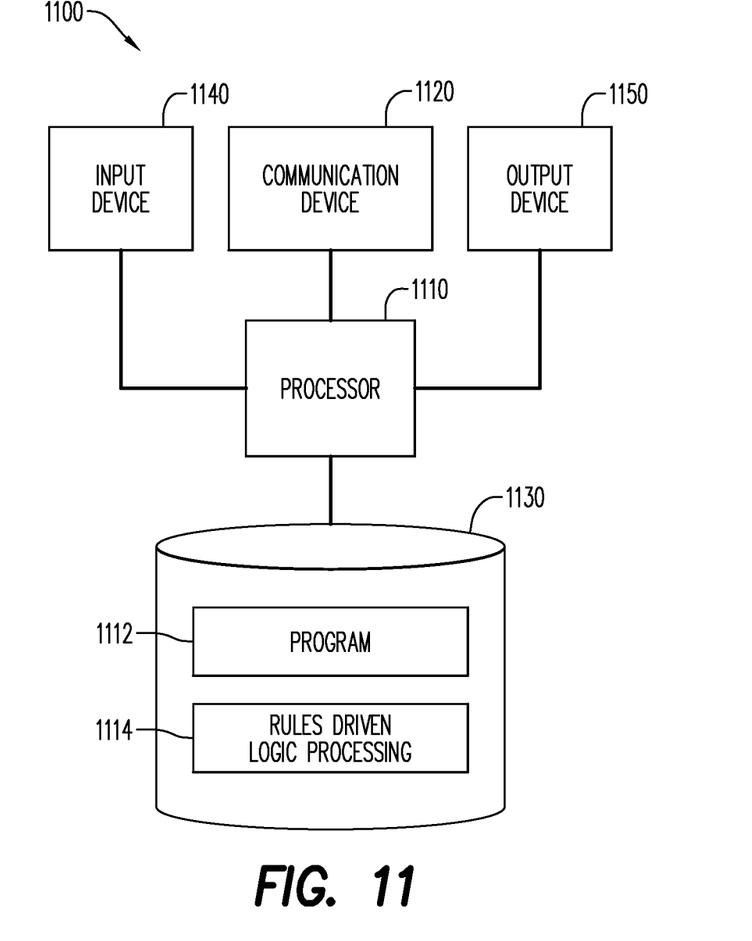
FIG. 11 is a block diagram of a system according to some embodiments.

FIG. 11 is a block diagram of apparatus 1100 according to some embodiments. Apparatus 1100 may comprise a general- or special-purpose computing apparatus and may execute program code to perform any of the functions described herein. Apparatus 1100 may comprise an implementation of one or more elements of system 200. Apparatus 1100 may include other unshown elements according to some embodiments.

Apparatus 1100 includes task UI processor 1110 operatively coupled to communication device 1120, data storage device 1130, one or more input devices 1140, one or more output devices 1150 and memory 1160. Communication device 1120 may facilitate communication with external devices, such as application server 230. Input device(s) 1140 may comprise, for example, a keyboard, a keypad, a mouse or other pointing device, a microphone, a knob or a switch, an infra-red (IR) port, a docking station, and/or a touch screen. Input device(s) 1140 may be used, for example, to manipulate graphical user interfaces and to input information into apparatus 1100. Output device(s) 1150 may comprise, for example, a display (e.g., a display screen) a speaker, and/or a printer.

Data storage device/memory 1130 may comprise any device, including combinations of magnetic storage devices (e.g., magnetic tape, hard disk drives and flash memory), optical storage devices, Read Only Memory (ROM) devices, Random Access Memory (RAM) etc.

Figure 4:
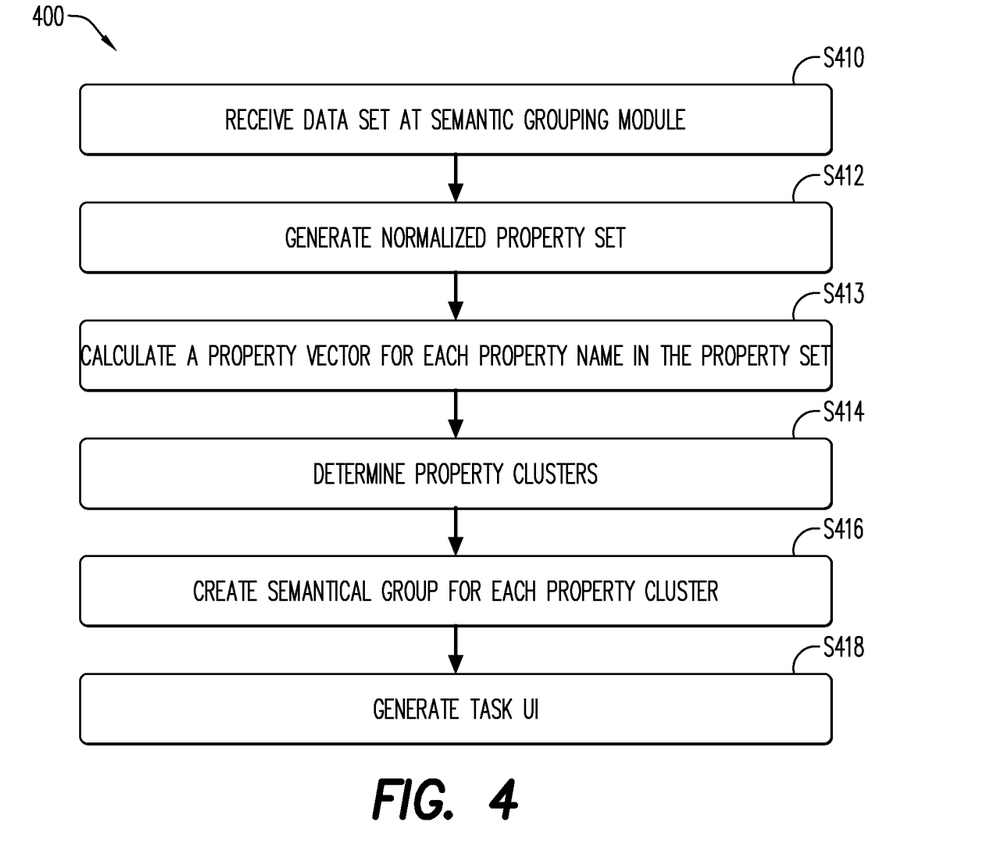
FIG. 4 is a flow diagram of a process according to some embodiments.

The storage device 1130 stores a program 1112 and/or task UI platform logic 1114 for controlling the processor 1110. The processor 1110 performs instructions of the programs 1112, 1114, and thereby operates in accordance with any of the embodiments described herein, including but not limited to processes 400/600.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   at least one data set including one or more properties in a task;
   a task UI module;
   a semantic grouping module including a neural network and a property cluster module;
   a display; and
   a processor in communication with the task UI module and the semantic grouping module and operative to execute processor-executable process steps to cause the system to:
      receive the data set at the semantic grouping module;
      calculate a property vector for each property in the data set, wherein the property vector includes a location of the property vector in a vector space;

determine one or more property clusters, via the property cluster module, for all of the property vectors; and automatically generate a section in a user interface for each of the one or more property clusters via the task user interface module.

2. The system of claim 1, wherein the neural network is trained with existing user interface layouts.

3. The system of claim 2, wherein training the neural network further comprises processor-executable process steps to cause the system to:

extract each property from the existing user interface layouts;

compare the extracted properties to properties of previously trained user interface layouts in the neural network; and adjust the neural network based on the comparison to calculate locations for each extracted property as a property vector.

4. The system of claim 3, wherein the location of each calculated property vector is relative to the other property vectors.

5. The system of claim 3, wherein calculating the location of each property vector further comprises processor-executable steps to cause the system to:

determine a semantic similarity between the extracted properties; and locate a position for the extracted property vectors having a high semantic similarity closer together in the vector space than extracted property vectors having a low semantic similarity.

6. The system of claim 5, wherein determining two extracted properties have a high semantic similarity is based on processor-executable steps to cause the system to:

determine the two extracted properties have corresponding properties in the existing user interface layout that are positioned in a same section of the existing user interface layout.

7. The system of claim 3, wherein determining a first and a second extracted property have a high semantic similarity is based on processor-executable steps to cause the system to:

determine a property corresponding to the first extracted property is positioned in the existing user interface layout near a property corresponding to a third extracted property and a property corresponding to the second extracted property in the existing user interface layout is positioned near the third extracted property.

8. The system of claim 1, wherein automatically generating the section in the user interface for each of the one or more property clusters further comprises processor-executable steps to cause the system to:

receive, at a user interface renderer, the generated one or more property clusters; and generate the user interface based on the received generated one or more property clusters, wherein the property vectors in a same property cluster are positioned on the user interface in a same section.

9. A computer-implemented method comprising:

training a neural network with existing user interface layouts for a first task;

receiving at least one data set at a semantic grouping module, the data set including one or more properties in a second task;

calculating a property vector for each property in the data set, wherein the property vector includes a location of the property vector in a vector space;

determining one or more property clusters for all of the positioned property vectors; and automatically generating a section in a user interface for each of the one or more property clusters corresponding to one or more properties of the one or more property vectors.

10. The method of claim 9, wherein the first task and the second task are the same.

11. The method of claim 9, wherein training the neural network further comprises:

extracting each property from the existing user interface layouts;

comparing the extracted properties to properties of previously trained user interface layouts in the neural network; and adjusting the neural network based on the comparison to calculate locations for each extracted property as a property vector.

12. The method of claim 11, wherein the location of each calculated property vector is relative to the other property vectors.

13. The method of claim 11, wherein calculating the location of each property vector further comprises:

determining a semantic similarity between the extracted properties; and locating a position for the extracted property vectors having a high semantic similarity closer together in the vector space than extracted property vectors having a low semantic similarity.

14. The method of claim 13, wherein determining two extracted properties have a high semantic similarity is based on determining the two extracted properties have corresponding properties in the existing user interface layout that are positioned in a same section of the existing user interface layout.

15. The method of claim 11, wherein determining a first and a second extracted property have a high semantic similarity is based on determining a property corresponding to the first extracted property is positioned in the existing user interface layout near a property corresponding to a third extracted property, and a property corresponding to the second extracted property in the existing user interface layout is positioned near the third extracted property.

16. The method of claim 9, wherein automatically generating the section in the user interface for each of the one or more property clusters further comprises:

receiving, at a user interface renderer, the generated one or more property clusters of property vectors; and generating the user interface based on the received generated one or more property clusters of property vectors, wherein the property vectors in a same property cluster are positioned on the user interface in a same section.

17. A non-transitory computer-readable medium storing program code, the program code executable by a computer system to cause the computer system to:

receive the data set at a semantic grouping module;

calculate a property vector for each property in the data set, wherein the property vector includes a location of the property vector in a vector space;

determine one or more property clusters for all of the positioned property vectors via a property cluster module; and automatically generate a section in a user interface for each of the one or more property clusters, via a task user interface module.

18. The medium of claim 17, wherein the semantic grouping module includes a neural network that is trained with existing user interface layouts.

19. The medium of claim 18, wherein training the neural network further comprises program code executable by the computer system to cause the system to:
- extract each property from the existing user interface layouts;
- compare the extracted properties to properties of previously trained user interface layouts in the neural network; and
- adjust the neural network based on the comparison to calculate locations for each extracted property as a property vector.

20. The medium of claim 17 wherein automatically generating the section in the user interface for each of the one or more property clusters further comprises program code executable by the computer system to cause the system to:
- receive, at a user interface renderer, the generated one or more property clusters of property vectors; and
- generate the user interface based on the received generated one or more property clusters of property vectors, wherein the property vectors in a same property cluster are positioned on the user interface in a same section.

* * * * *